United States Patent [19]

van Gerwen et al.

[11] 4,313,088
[45] Jan. 26, 1982

[54] ARRANGEMENT FOR GENERATING A CLOCK SIGNAL

[75] Inventors: Petrus J. van Gerwen; Wilfred A. M. Snijders, both of Eindhoven, Netherlands

[73] Assignee: U.S. Philips Corporation, New York, N.Y.

[21] Appl. No.: 137,866

[22] Filed: Apr. 7, 1980

[30] Foreign Application Priority Data

Apr. 20, 1979 [NL] Netherlands ..................... 7903099

[51] Int. Cl.³ ............................................. H04L 7/00
[52] U.S. Cl. ..................................... 328/63; 328/74; 375/110
[58] Field of Search .................. 328/63, 74; 375/87, 375/118, 110

[56] References Cited

U.S. PATENT DOCUMENTS 3,500,215  3/1970  Leuthold et al. .................. 328/63
3,916,084  10/1975  Toole ................................ 328/63

OTHER PUBLICATIONS

Mengali, U., "A Self Bit Synchronizer Matched to the Signal Shape," *IEEE Trans. Aerospace and Electron. Sys.* vol. AES-7, No. 4, Jul. 1971, pp. 686-693.

*Primary Examiner*—Alfred E. Smith
*Assistant Examiner*—T. N. Grigsby
*Attorney, Agent, or Firm*—Thomas A. Briody; William J. Streeter; Edward W. Goodman

[57] ABSTRACT

Arrangement for clock signal generation from a received data signal located in baseband, for use in baseband modems. In addition to signal transitions which provide clock information in a reliable manner, several types of data signals contain disturbing signal transitions. These disturbing transitions are eliminated by converting the spectrum of the received data signal into the spectrum of a bi-phase modulated signal. It is possible to obtain a reliable clock signal from the signal transitions of the converted signal with small acquisition times.

3 Claims, 11 Drawing Figures

ARRANGEMENT FOR GENERATING A CLOCK SIGNAL

A. BACKGROUND OF THE INVENTION

A(1). Field of the Invention

The invention relates to an arrangement for generating a clock signal from a received data signal located in a base band, comprising a zero-crossing detector having connected thereto a frequency selective device from which the clock signal is derived.

A(2). Description of the Prior Art

A generally known method of transmitting binary data symbols without the use of direct current and having sufficient clock information is bi-phase modulation, the bit rate being the carrier frequency. In this method there is a signal transition comprising the clock information in the centre of each symbol interval (FIG. 2). Other signal transitions which are determined by the data, occur between the symbol intervals. The signal transitions can be detected by a zero-crossing detector and are then applied to a phase-locked loop which is synchronized at twice the bit rate. A signal having the bit rate is derived therefrom by a divide-by-two frequency divider.

In another known method of clock generation the data signal is pre-processed in a non-linear manner and thereafter a signal having the bit rate is derived from the pre-processed data signal by means of filtering. This method, which is often used when the received data signal itself does not contain frequency components which are coupled to the bit rate requires an averaging of the phase fluctuations over a longer period of time.

In some methods of coding data symbols to obtain an amplitude-spectrum of particular shape, disturbing signal transitions occur which do not furnish reliable clock information. These unwanted signal transitions can be masked by keying pulses when they occur at instants which are clearly distinct from the desired signal transitions, which in practice, is not always the case, particularly in the case of transmission over a cable.

B. SUMMARY OF THE INVENTION

It is an object of the invention to suppress disturbing signal transisions, and thereby to enhance the desired signal transitions. This increases the ratio between the desired reliable clock information and the unreliable clock information transmitted by the disturbing signal transitions. This ratio may be considered as a kind of signal-to-noise ratio for the clock generation. The normal noise originating from the transmission path plays a much less important part, owing to the narrow frequency band of the clock generation channel. The increased clock signal-to-noise ratio enables the realization of small acquisition times.

The arrangement according to the invention is characterized in that means are provided between the input for the received data signal and the zero-crossing detector for converting the spectrum of the received data signal into the spectrum of a bi-phase modulated signal having the bit rate as the carrier frequency, and a carrier which is in-phase with the data signal.

C. SHORT DESCRIPTION OF THE FIGURES

FIGS. 4a–14d shows some eye patterns;

FIG. 5 shows some filter characteristics of the receiver filter of the receiver shown in FIG. 3;

FIG. 6 is a block diagram of a second receiver provided with an arrangement according to the invention;

FIG. 7 shows the coding of the data symbols in accordance with a so-called "top hat"-code; and FIG. 8 is a block diagram of a third receiver provided with an arrangement according to the invention.

D. DESCRIPTION OF THE PREFERRED EMBODIMENT

Figure 1:
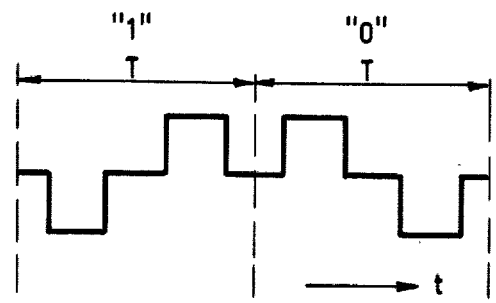
FIG. 1 shows the coding of the data symbols in accordance with a so-called the "crankshaft-" code.

FIG. 1 shows two waveforms resulting from a coding method for the data symbols "1" and "0" respectively in synchronous symbol time intervals of T seconds. In view of the shape of the waveforms this coding method is called the "crankshaft" code.

A network having an impulse response corresponding to the waveforms of FIG. 1 has a transfer function which, neglecting a constant real factor, is defined by the expression $$\frac{1}{j} \sin\left(\frac{wT}{4}\right) \cdot \frac{\sin\frac{wT}{8}}{\frac{wT}{8}} \tag{1}$$

Figure 3:
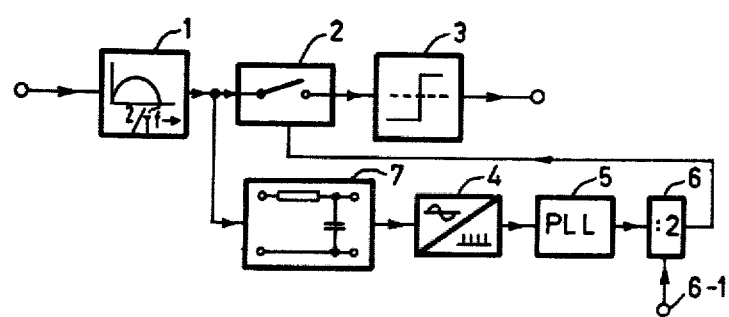
FIG. 3 is a block diagram of a receiver provided with an arrangement according to the invention.

FIG. 3 shows an optimum receiver for data signals encoded in accordance with the "crankshaft" code. This receiver comprises a low-pass receive filter 1, a sampling switch 2 and a polarity detector 3 connected in cascade. The low-pass filter 1 has a cut-off frequency which is twice the bit rate 2/T Hz, its filter characteristic varying sinusoidally. The transfer function of the optimum filter is given by the expression:

$$j \sin(wT/4) \tag{2}$$

The signal spectrum at the output of the receive filter 1 on the receipt of signals encoded in accordance with the "crankshaft"-code is defined by the expression:

$$\sin^2\left(\frac{wT}{4}\right) \cdot \frac{\sin\frac{wT}{8}}{\frac{wT}{8}} \tag{3}$$

The second term which is caused by the width of the pulses used during the transmission has little influence in the range of 0 Hz to 2/T Hz and may be assumed to be approximately equal to 1 in this range.

The signal spectrum at the output of the receive filter 1 is then approximately defined by the expression $$\sin^2(wT/4) \tag{4}$$

It should be noted that, for simplicity, constant real factors have been omitted here and hereinafter from the expression because they represent for all frequencies an equal attenuation (or gain), which is of no importance here.

Figure 4:
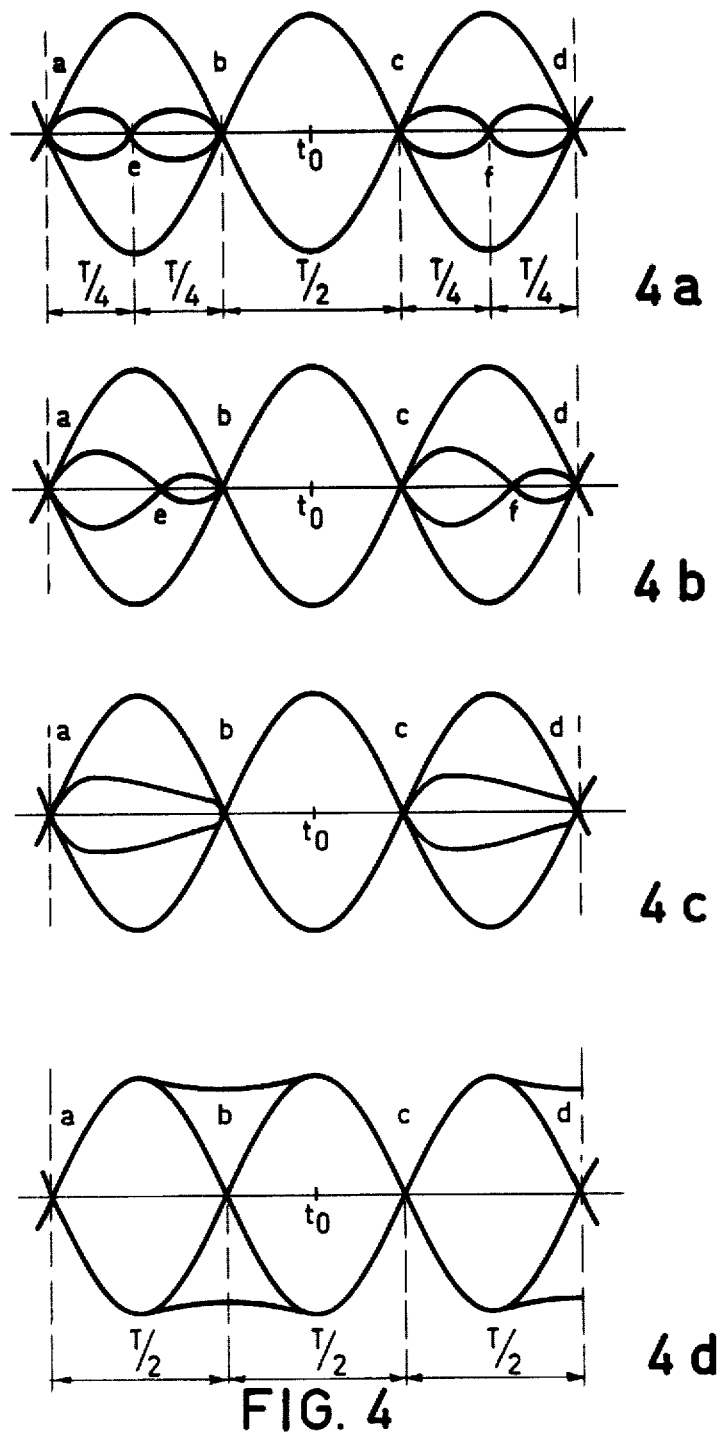

The eye pattern of a signal having a spectrum of 0 Hz to 2/T Hz, which satisfies expression (4), is shown in FIG. 4a. Sampling switch 2 samples the output signal of receive filter 1 at the sampling instants $t_o \pm nT$. The FIGS. 4b and 4c illustrate how the eye pattern is affected when a cable of an increasing length is connected between the transmitter and the receiver. The signal transitions indicated by a, b, c, d are the reliable signal transitions. The signal transitions indicated by e and f are the disturbing signal transitions.

The clock generation channel of the receiver shown in FIG. 3 comprises a zero-crossing detector 4, a phase-locked loop 5 and a divide-by-two frequency divider 6, connected in cascade.

A filter device 7 is arranged between the output of the receive filter 1 and the zero-crossing detector 4.

This filter device 7 has such a filter characteristic that the disturbing zero-crossings e and f are eliminated. When "crankshaft"-coding is applied, filter device 7 is constituted by an integrator. The eye pattern at the output of filter device 7 is shown in FIG. 4c, from which it appears that the desired signal transitions a, b, which it appears that the desired signal transitions a, b, c and d have been preserved, whereas the disturbing signal transitions e and f have been suppressed. The devices 4, 5 and 6 extract in known manner a clock signal having the symbol frequency 1/T Hz, from the signal transitions a, b, c, d. The frequency divider 6 has a control input 6-1 for adjusting the correct phase of this divider. In principle, a control signal for this control input 6-1 can be obtained by manual operation. Extracting a control signal from the received data signal is not the subject of this patent application.

Figure 2:
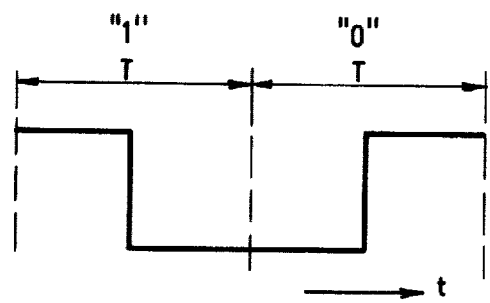
FIG. 2 illustrates bi-phase modulation waveforms.

The eye pattern shown in FIG. 4d is the eye pattern of a bi-phase modulated signal whose carrier frequency is equal to the bit rate and whose carrier is in-phase with the data signal. The waveforms occurring with this bi-phase modulation for a symbol having the values "1" and "0" are shown in FIG. 2.

The spectrum function of a bi-phase modulated signal is expressed by:

$$j \sin\left(\frac{wT}{4}\right) \cdot \frac{\sin\frac{wT}{4}}{w} \qquad (5)$$

Neglecting the sign, this expression differs from the expression (4) by the factor 1/jw. The factor 1/jw is the transfer function of an integrator. So the integrator 7 converts the spectrum at the output of filter 1, which is defined by expression (4), into the spectrum of a bi-phase modulated signal. This spectrum conversion eliminates the disturbing zero-crossings. It should be noted that the signal transitions a and c in FIG. 4d occur independent of the data. These transitions correspond to the transitions in the centre of the symbol interval which are typical of bi-phase modulation as seen in FIG. 2.

Figure 6:
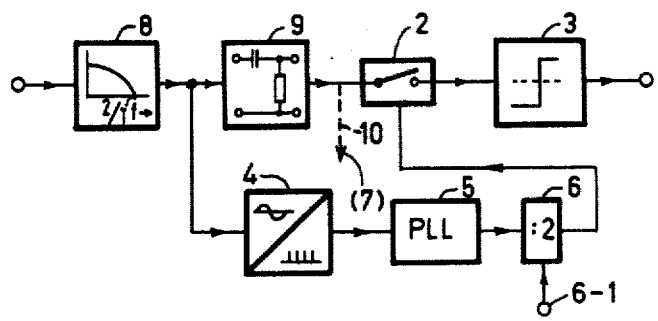

The filter 1 of FIG. 3 can be replaced by the cascade arrangement of two filters 8 and 9, as shown in FIG. 6.

Between 0 Hz and the cut-off frequency of twice the bit rate 2/T Hz the low-pass filter 8 has the transfer function cos (wT/8). The filter 9 is a differentiator having the transfer function jw. The transfer function of the two cascaded filters is defined by:

$$jw \cos (wT/8) \qquad (6)$$

Figure 5:
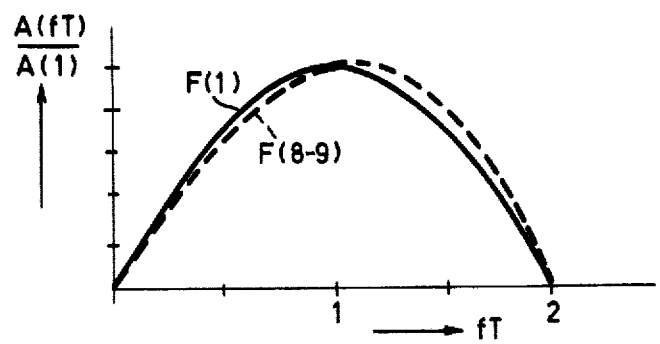

When a signal encoded in accordance with the "crankshaft"-code is applied to the input of the receiver, the signal at the output of differentiator 9 has then the spectrum in accordance with expression (4). This can be seen by multiplying expression (1) by expression (6). The filter characteristics of filter 1 and the cascaded filters 8 and 9 are illustrated in FIG. 5 by means of the curves F(1) and F(8–9).

The clock signal channel may comprise the two filters 8 and 9 in which case a connection 10 will then lead to filter 7 of FIG. 3. However, it is now possible to have the filters 7 and 9, one of which is an integrator and the other a differentiator, cancel each other. The signal for the clock generation is then applied as is shown in FIG. 6, directly to zero-crossing detector 4 via the filter 8. It still holds that the spectrum of the signal at the input of zero-crossing detector 4 is equal to the spectrum of a bi-phase modulated signal. This can be seen by multiplying expression (1) by the transfer function cos (wT/8) of filter 8, which results in expression (5), neglecting an non-relevant constant real factor.

Figure 7:
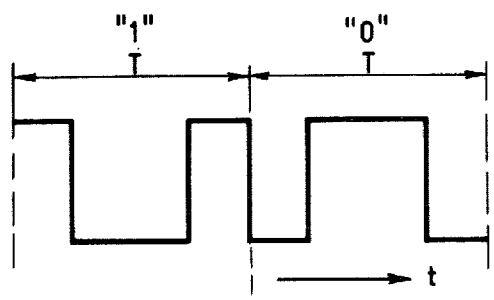

FIG. 7 shows a further method of signal coding within a symbol interval. This code is known as the so-called "top hat"-code because of the waveform shape it produces. This code corresponds to bi-phase modulation on a carrier whose phase is shifted 90° with respect to the symbol intervals. This code is described in the U.S. Pat. No. 3,846,583.

The spectrum of the "top hat"-code is defined by the expression:

$$\sin\left(\frac{wT}{4}\right) \cdot \sin\left(\frac{wT}{8}\right) \cdot \frac{\sin\frac{wT}{8}}{w} \qquad (7)$$

In the range from 0 Hz to twice the bit rate the last term can be assumed to be approximately equal to a constant, so that expression (7) becomes the expression.

$$\sin^2\left(\frac{wT}{4}\right) \cdot \frac{1}{\cos\left(\frac{wT}{8}\right)} \qquad (8)$$

neglecting a non-relevant constant real factor.

Figure 8:
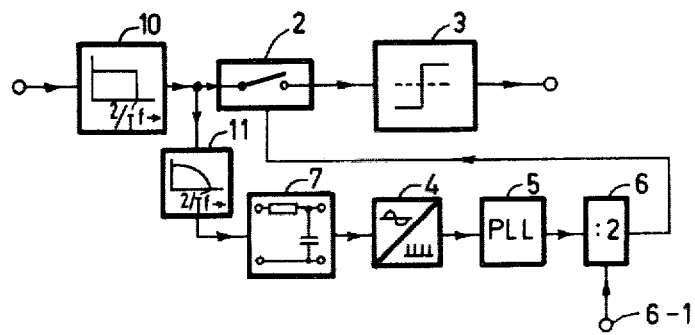

The receiver for this code, shown in FIG. 8, comprises a low-pass filter 10 having a uniform filter characteristic up to twice the bit rate. The clock signal channel comprises a filter 11, having the transfer function cos (wT/8), and the integrator 7, connected in cascade. The cascaded filters 11 and 7 convert the spectrum of the "top hat"-code into the spectrum of a bi-phase modulated signal having an in-phase carrier.

It should be noted that when a long cable is present between the transmitter and the receiver, the cable approximately takes over the function of filter 11, so that this filter can be omitted from the clock signal channel of the receiver. It is then sufficient to use a simple integrator 7. The filter 10 has for its function to limit the noise bandwidth. When the signal-to-noise ratio need not satisfy stringent requirements, the filter characteristic above the cut-off frequency may drop less steeply, which also holds for the filters 1 and 8 of the FIGS. 3 and 6.

What is claimed is:

1. An arrangement for generating a clock signal from a received data signal located in a base band, comprising a zero-crossing detector having connected thereto a frequency-selective device from which the clock signal is derived, characterized in that means are provided between the input for the received data signal and the zero-crossing detector for converting the spectrum of the received data signal into the spectrum of a bi-phase modulated signal having the bit rate as the carrier frequency and a carrier which is in-phase with the data signal.

2. An arrangement as claimed in claim 1, characterized in that the means are formed by a low-pass filter having a cut-off frequency which is twice the bit rate, whose filter characteristic has zeros at 0 Hz and at the cut-off frequency and a sinusoidal variation between these zeros, and an integrator connected in cascade.

3. An arrangement as claimed in claim 1, characterized in that the means are formed by a low-pass filter having a cut-off frequency which is twice the bit rate, whose filter characteristic has a maximum at 0 Hz and a zero at the cut-off frequency and a cosinusoidal variation between 0 Hz and the cut-off frequency.

* * * * *